June 3, 1941.　　　T. J. HOY　　　2,243,863
POPPET VALVE
Filed Aug. 25, 1939
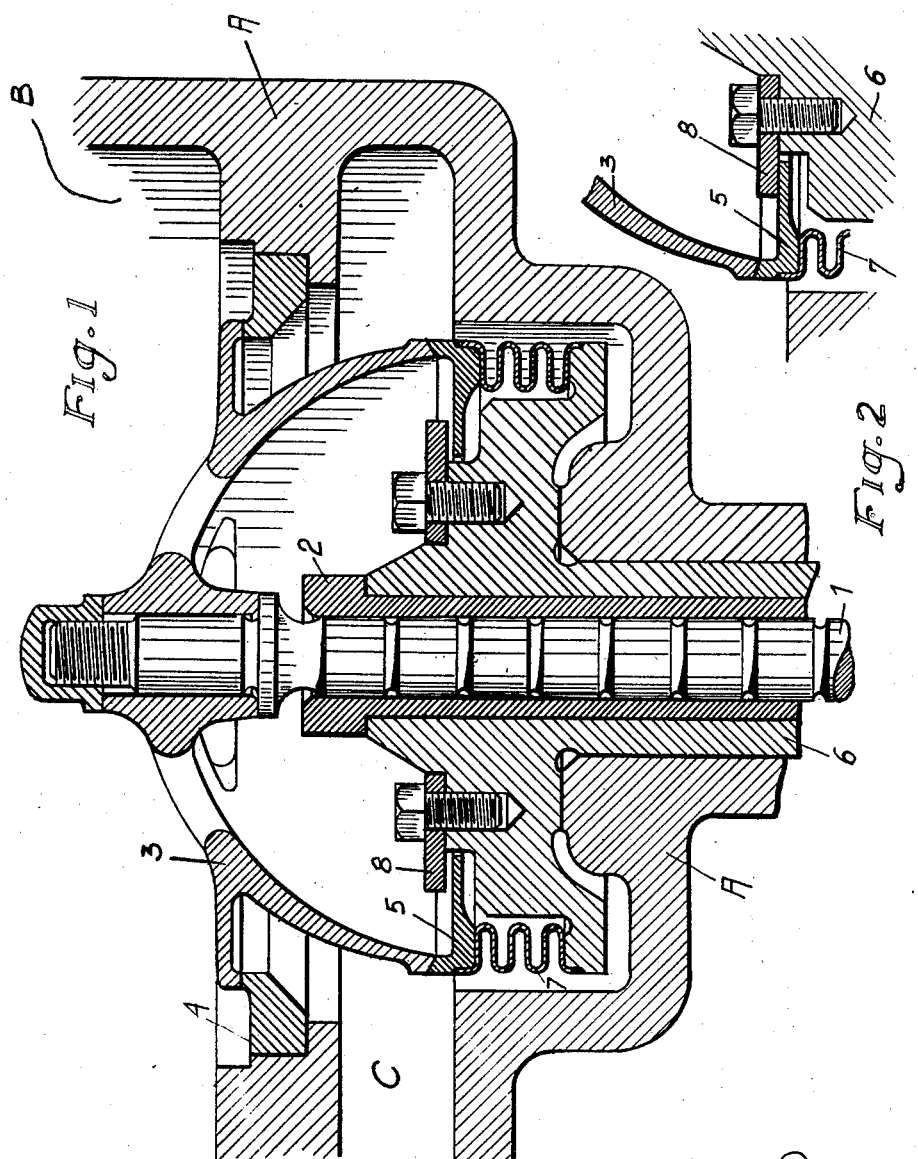
Thomas J. Hoy
INVENTOR Patented June 3, 1941

2,243,863

UNITED STATES PATENT OFFICE 2,243,863

POPPET VALVE

Thomas J. Hoy, Newark, N. J.

Application August 25, 1939, Serial No. 291,806

4 Claims. (Cl. 121—185)

The invention relates to a double seat poppet valve for steam engines or control devices for steam, air, gas or other elastic or non-elastic fluids.

The primary object of the invention is the provision of a device of this character, wherein a positive sealing pressure between both poppet valve seats and their respective facings in the valve housing is obtained at all times regardless of distortion in the housing due to high temperatures or uneven expansion of the castings or any other causes.

Another object of this invention is the provision of a device of this character, wherein the same can readily and easily be adapted to suit the space conditions of already existing casting structures in which poppet valves of the double seated type are employed, so as to make the conversion to use the new poppet valve structure an easy matter. A further object of the invention is the provision of a device of this character, which is simple in construction, reliable and efficient in operation, strong and durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Fig. 1 is a longitudinal section of a poppet valve assembly within the valve chest housing with the device constructed in accordance with the invention applied to the assembly.

Fig. 2 is a fragmentary sectional view of the inner valve seating.

Similar reference characters and numbers indicate corresponding parts throughout the views in the drawing.

Referring to the drawing in detail, A designates a portion of a valve chest adapted to accommodate a double seat poppet valve as means to regulate the flow of fluid from the portion B of the said valve chest, the fluid flows to port C if the poppet valve 3 is lifted off its seats 4 and 5.

The poppet valve 3 is securely attached to valve stem 1 which slides in a valve stem guide sleeve 2. Valve stem guide sleeve 2 in turn is presssed into adapter piece 6 which can be readily removed from valve chest housing A for repair and replacement purposes.

The outer valve seat 4 can be preferably made flat and ringshaped as shown. The inner valve seat 5 can be preferably made spherical for aligning purposes. This said valve seat 5 which is made as light as possible is yieldingly attached to adapter piece 6 by means of metallic bellows 7 which are welded pressure tight to valve seat 5 at one extreme end and to the ringshaped projection of the adapter piece 6 on the other extreme end. In addition a restraining ring 8 is attached to part 6.

In Figure 1 the poppet valve is shown in the shut position and an impulse transmitted through valve spindle 1 causes the said poppet valve to move in a direction substantially at right angles to the focal plane of the valve seat 4.

It should be apparent from Figure 1 that a small predetermined gap exists between the restraining ring 8 and the inner valve seat 5. The length and thickness of the metallic bellows is calculated in such a way that an appropriate compression force is exerted by the bellows which urges the inner valve seat 5 to press against the corresponding face of the poppet valve to create a positive sealing pressure sufficient to prevent the escape of the fluid from the inside of the valve into port C. The valve spindle diameter is so proportioned that the force of the fluid which tends to press the poppet valve against its seats, augmented by any supplementary spring pressure which may assist the fluid pressure force, is always in excess of the force exerted by the metallic bellows which counteracts the fluid force. Therefore a positive sealing pressure will prevail all the time between the poppet valve and its seats 4 and 5. Since the gap between the restraining ring 8 and the inner valve seat 5 is made sufficiently wide to exceed in magnitude any possible breathing effects in the housing A, it follows that the resilient connection established through the pressure tight metal bellows will obviate most of the difficulties experienced with the known types of poppet valve assemblies in the rigid seats.

It will be appreciated that the interposition of several resilient coils of the bellows 7 will also render the proper seating between ring 5 and the poppet valve 3 more effective as a slight radial and oblique movement in relation to the valve stem axis is also possible, which, combined with the spherical shape of the inner valve seating will ensure the greatest possible sealing properties of the whole assembly.

By referring to Fig. 2 it will be noted that the gap between restraining ring 8 and the inner valve seat 5 is completely closed. Under normal operating conditions this will correspond to a position of the poppet valve wherein the outer valve seat is off by the distance corresponding to the width of the gap.

If it is assumed that the poppet valve moves from its full open position to its shut position, it will be apparent that a slight impact takes place at the moment of contact between the poppet valve 3 and the inner valve seat 5. In order to minimize the resulting shock load, the mass of the inner valve seat is kept down to a minimum and since the connection between part 5 and the heavy mass of the casting structure A is made resilient through the interposition of the shock absorbing metal bellows 7, which are rather light in weight, the hammering effect which is noticeable on the known types of poppet valves will be greatly reduced and consequently a longer life of the valve seats is to be expected as well as a greatly improved fluid tightness.

By removing the restraining ring 8 from part 6, the metal bellows 7 will expand further outward until the free length is reached and the difference between the free length and the bellows length obtained when inner valve seat 5 butts up against restraining ring 8 is proportional to the amount of pre-loading necessary to make a positive seal.

From the foregoing it will be clear, that by a variation of the thickness of the restraining ring 8 a corresponding variation in the sealing force exerted by the metal bellows can be obtained to suit each individual application, without any change in the other valve assembly parts, therefore the adaptability of the device to operate under varying pressure conditions will be greatly enhanced and the cost of manufacture reduced.

The scope of the foregoing invention is not limited to the construction of the valve chest as shown in Fig. 1 but can also be widened by those skilled in the art to apply generally to double seat poppet valve arrangements in which the flow of the elastic fluid is directed from a zone of higher pressure within the valve body to a zone of lower pressure surrounding the said valve body, when same is seated on its respective seating faces.

What is claimed is:

1. In a poppet valve construction of the character described, comprising a poppet valve, a stem therefor, valve seatings attached resiliently in a fluid tight manner to the structure surrounding the poppet valve, through flexible metallic bellows of the Sylphon type.

2. In a poppet valve construction of the character described, comprising a poppet valve, a stem therefor, valve seatings attached to the structure surrounding the poppet valve through flexible metallic bellows of the Sylphon type, said valve seatings having freedom to move obliquely in relation to the geometrical poppet valve axis without disturbing fluid tightness.

3. In a poppet valve construction, of the character described, having two valve seats, comprising a poppet valve, a stem therefor, one of the valve seatings attached resiliently in a fluid tight manner to the structure surrounding the said poppet valve, through flexible metallic bellows.

4. In a poppet valve construction, of the character described, having two valve seats, comprising a poppet valve, a stem therefor, one of the valve seatings attached to the structure surrounding the said poppet valve through flexible metallic bellows, said valve seating being free to move obliquely in relation to the geometrical poppet valve axis without disturbing fluid tightness.

THOMAS J. HOY.